United States Patent [19]

Spina et al.

[11] Patent Number: 5,122,327
[45] Date of Patent: Jun. 16, 1992

[54] BLOW MOLDING METHOD FOR MAKING A REVERSELY ORIENTED HOT FILL CONTAINER

[75] Inventors: Dennis R. Spina, Onsted, Mich.; Samuel E. Evins, Olathe, Kans.

[73] Assignee: Hoover Universal, Inc., Plymouth, Mich.

[21] Appl. No.: 687,041

[22] Filed: Apr. 18, 1991

[51] Int. Cl.$^5$ .............. B29C 49/04; B29C 49/06; B29C 49/64
[52] U.S. Cl. .................. 264/534; 264/230; 264/346; 264/532; 425/525; 425/526; 425/529; 215/1 C
[58] Field of Search ........... 264/534, 230, 235, 346, 264/342 R, 532, 524, 525, 537, 540; 425/525, 529, 526; 215/1 C

[56] References Cited

U.S. PATENT DOCUMENTS

| | | | |
|---|---|---|---|
| 3,733,309 | 5/1973 | Wyeth et al. | 260/75 T |
| 4,036,926 | 7/1977 | Chang | 425/525 |
| 4,318,882 | 3/1982 | Agrawal et al. | 264/521 |
| 4,385,089 | 5/1983 | Bonnebat et al. | 264/535 |
| 4,497,855 | 2/1985 | Agrawal et al. | 426/399 |
| 4,512,948 | 4/1985 | Jabarin | 264/521 |
| 4,524,045 | 6/1985 | Hayashi et al. | 264/521 |
| 4,769,206 | 9/1988 | Reymann et al. | 425/525 |
| 4,836,971 | 6/1989 | Denis et al. | 264/521 |
| 4,863,046 | 9/1989 | Collette et al. | 215/1 C |

FOREIGN PATENT DOCUMENTS

| | | | |
|---|---|---|---|
| 220099 | 11/1957 | Australia | 264/534 |
| 57-8122 | 1/1982 | Japan | 264/534 |
| 1-157828 | 6/1989 | Japan | 264/235 |
| 1456171 | 11/1976 | United Kingdom | 264/534 |

Primary Examiner—Jan H. Silbaugh
Assistant Examiner—Catherine Timm
Attorney, Agent, or Firm—Harness, Dickey & Pierce

[57] ABSTRACT

A blow molded container formed of a polyester resin for use in hot fill applications. The container includes upright side walls, an integral base and a preselected outwardly thermoelastically deformable portion. Upon being filled with a liquid at an elevated temperature, the deformable portion of the container deforms outwardly to partially increase the volumetric size of the container. The remaining portions of the container generally shrink in response to being hot filled.

6 Claims, 4 Drawing Sheets

BLOW MOLDING METHOD FOR MAKING A REVERSELY ORIENTED HOT FILL CONTAINER

BACKGROUND AND SUMMARY OF THE INVENTION

The present invention relates to polyester resin containers and more particularly to hot fill containers formed from polyethylene terephthalate.

The use of polyester resin containers for the packaging of various materials is being seen with increasing regularity. One such container is formed by blow molding polyethylene terephthalate (PET) so as to produce a biaxially oriented beverage container. It is also becoming increasingly desirable to utilize these blown containers with beverages that are packaged while at an elevated temperature to insure sterilization and/or pasteurization of the contents. These beverages are commonly referred to as "hot fill" beverages. Unfortunately, without further treatment, a PET container which has only been blow molded will not exhibit adequate thermal stability. Upon receiving the "hot fill" liquid, the container uncontrollably deforms into an unacceptable product.

Various methods have been devised to counter thermal instabilities. Two general methods have evolved. The first is mechanical and involves forming the polyester into a structural configuration which can maintain stability during hot fill. The second method broadly involves heat treating the polyester to induce molecular changes which will result in a container exhibiting thermal stability.

U.S. Pat. No. 3,733,309 discloses a PET bottle which is heat treated after molding to increase the crystallinity of the PET material and thereby reduce the thermal shrinkage involved during hot fill. U.S. Pat. No. 4,863,046 discloses performing a complex heat treatment method on a plastic preform and subsequently results in a hot fill container which exhibits a volumetric shrinkage of no greater than 1 percent.

In both of the above heat treating methods, the temperature of the PET material is significantly increased to produce the desired thermal stability and reduce deformation resulting from hot filling. However, because of the longer time interval required for heating and cooling the PET material to and from the high treatment temperatures, the cycle time for producing a PET container is increased. Another disadvantage of the above methods is that energy consumption per container produced is large and extremely inefficient.

With the above limitations in mind, it is a principle object of the present invention to produce a thermally stable blow molded hot fill container.

Another object of the invention is to reduce the cycle time required to produce a hot fill PET container.

It is an additional object of this invention to produce a hot fill PET container that utilizes reduced heat treating temperatures.

A further object of the invention is to produce a hot fill PET container which partially increases in volume during hot fill.

It is also an object of this invention to decrease the amount of energy which is consumed during the production of a hot fill container.

In achieving the above objects, the present invention seeks to offset thermal shrinkage by inducing a partial increase in volumetric size. In so doing, the present invention provides for a hot fill container having outward thermoelastically deformable panels. Furthermore, the formation of the panels, and the container itself, is done in a single molding process and does not require additional molds.

In forming the container according to the present invention, a preform or parison is blow molded into a first container configuration. The molded container is then heat treated at a relatively low temperature while it remains within the mold cavity in the first configuration. For reasons further described below, the heat treating temperature does not need to be raised to the high temperatures previously seen and required to limit shrinkage to one percent. Previously, the heat treating temperatures were commonly seen in a temperature range of 220° to 260° F.

After low temperature heat treating and prior to hot filling, a portion of the first configuration of the PET material is deformed inward. By deforming portions of the container inward, the resulting second configuration of the container exhibits a reduced volume. The container is then maintained in this reduced volume configuration until it has been sufficiently cooled to permit ejection from the mold.

As a result, when the container of the present invention is hot filled, the elevated temperature of the liquid causes the inwardly deformed portions of the PET container to expand outwardly, partially increasing the volume of the container, returning generally to the first blow molded configuration. The increase in volume created by the outward deformation of the PET material is sufficient to offset or counter the thermal shrinkage experienced by the PET material not deformed prior to filling.

The inwardly deformed portions of PET material expand outwardly during hot filling because the PET material in these portions has been reversely oriented. In other words, during heat treating, the stresses in the PET material are relaxed and the PET substantially "forgets" its original preform shape. The first blown configuration of the container essentially becomes a second preform shape. Upon inward deformation of portions of the container's first configuration, molecular orientation is reintroduced into the PET material resulting in the container's "memory" being that of the second preform. When hot fill liquid is now added to the container, the deformed portions "remember" the second preform shape and deflect outwardly to partially increase the volume of the container.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE PREFERRED EMBODIMENTS

Figure 1:
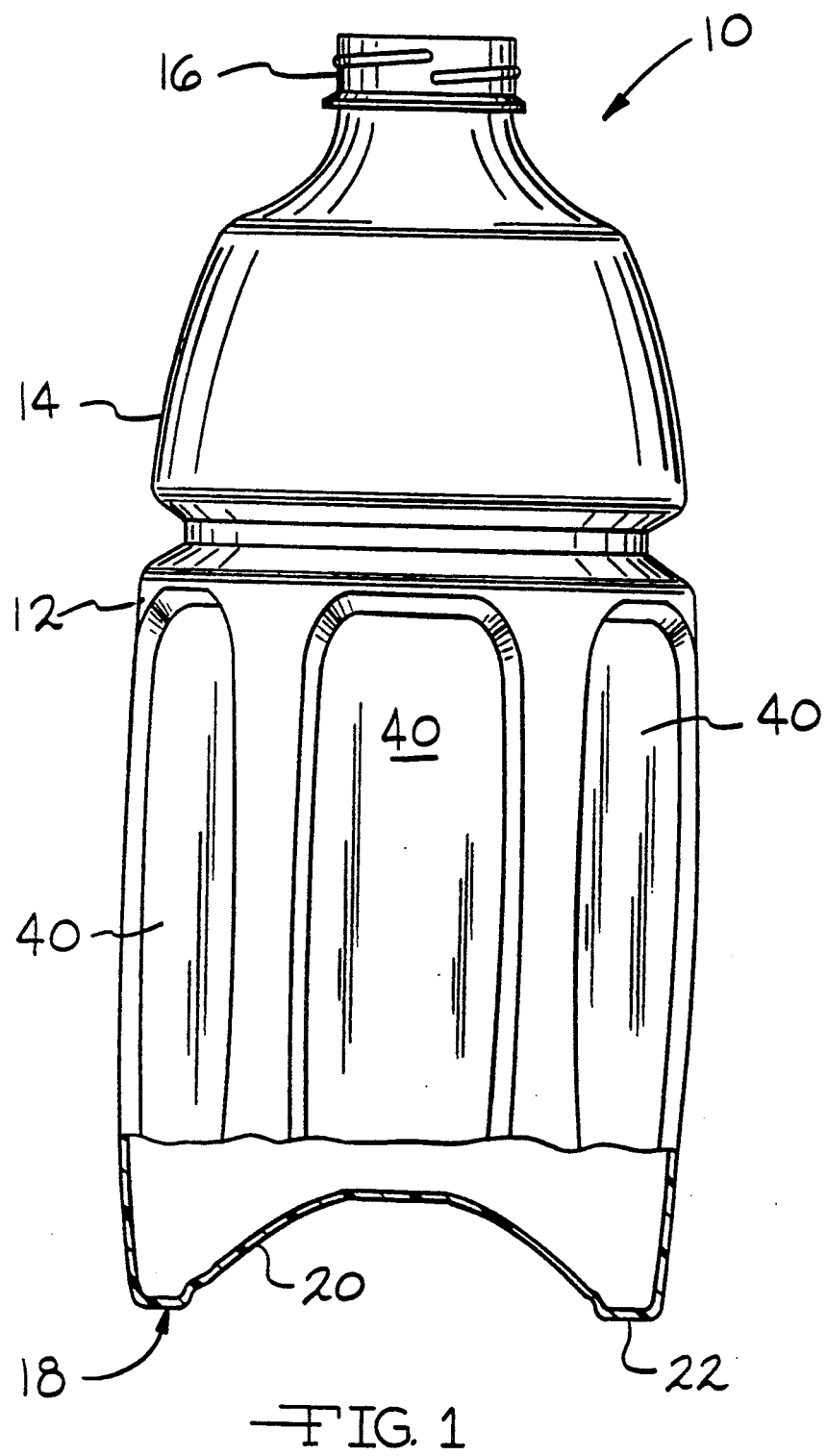
FIG. 1 is an elevational view with a portion broken away of a container formed in accordance with the present invention.

With reference to the drawing, the container of this invention, indicated generally at 10, is illustrated in FIG. 1 as having a main side wall portion 12 of generally round cylindrical shape. The main side wall 12 is formed with a minor side wall portion 14 that tapers upwardly into a narrowing neck 16. The neck 16 is threaded to accept a closure cap (not shown) and seal the container 10. At its lowermost end, the main side wall 12 is integrally formed with a base 18 having an upwardly and inwardly directed dome portion 20 and a generally annular support ring 22 at the periphery thereof.

As mentioned above, hot fill containers are generally heat treated at high temperatures (220° to 260° F.) for a length of time that is sufficient to limit thermal shrinkage in response to hot filling to, typically, one percent or less of the container's volumetric size. An inherent result of the high temperatures is that the cycle time for producing the container is increased, due to the amount of time required to heat and cool the PET material, and energy consumption is increased.

If the container is heat treated at a lower temperature, thereby allowing for a shorter cycle time, the container will typically exhibit an increased amount of thermal instability and random deformation resulting in an uncontrolled volumetric decrease. As the heat treating temperature is decreased, it becomes progressively difficult to control the volumetric shrinkage and the resulting container configuration. If shrinkage is not controlled and a significant volumetric decrease occurs, the fill level of the liquid within the container may rise as a result thereof to a point where it overflows the container.

From the above discussion it can be seen that, from a production standpoint, it is desirable to reduce both the cycle time and production costs involved in producing a container while maintaining adequate control over the container's final configuration.

Figure 2:
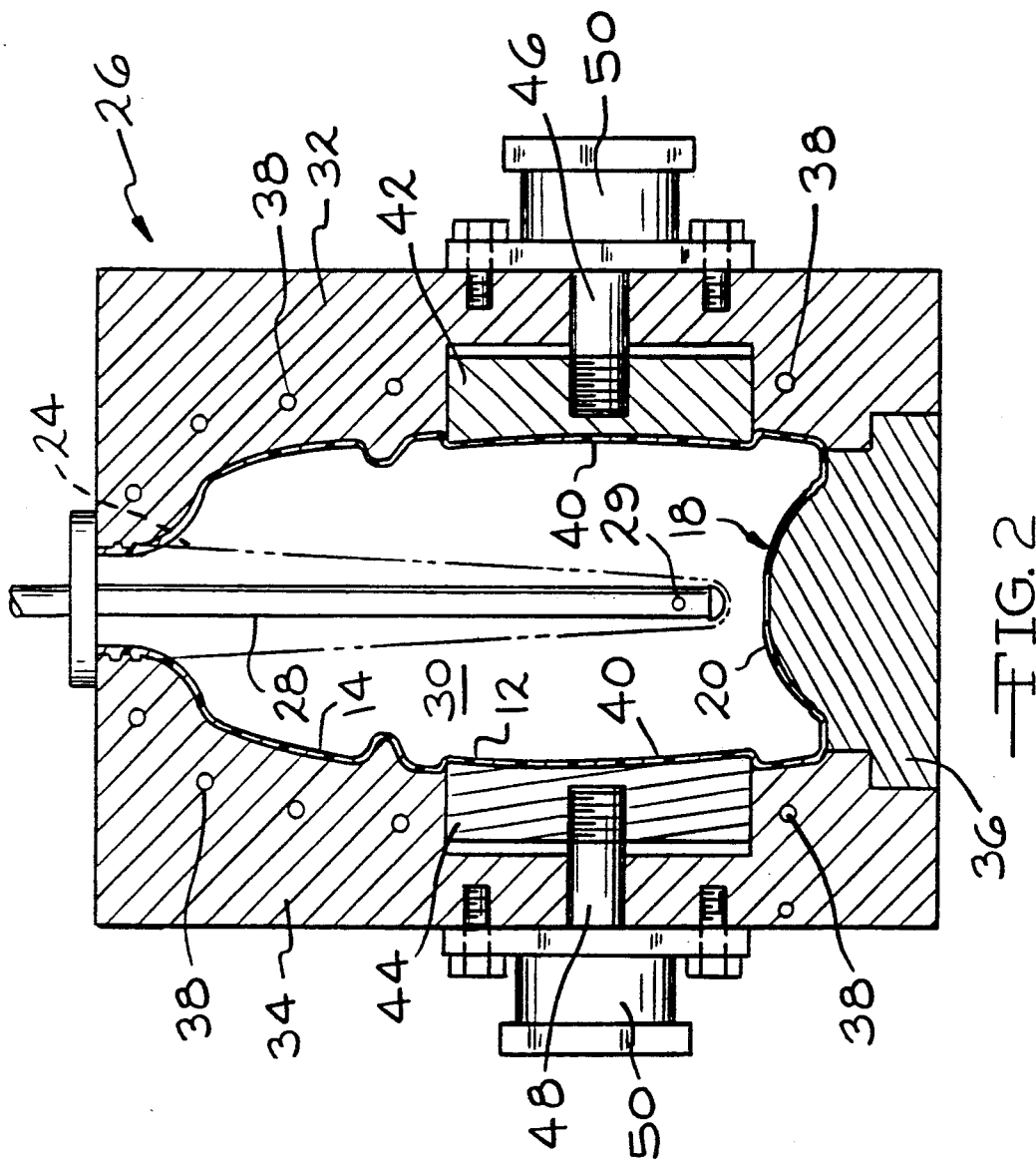
FIG. 2 is a sectional view of a container embodying the principles of the present invention being molded in a blow molding machine.

The present invention avoids these limitations while achieving the desired results. As seen in FIG. 2, a parison or preform 24 is blow molded in a blow molding machine 26 into a first configuration. While various sequences exist for molding and heat treating the PET, it should be noted that the attributes of the present invention have application to sequences varying from those specifically set forth below.

Figure 3:
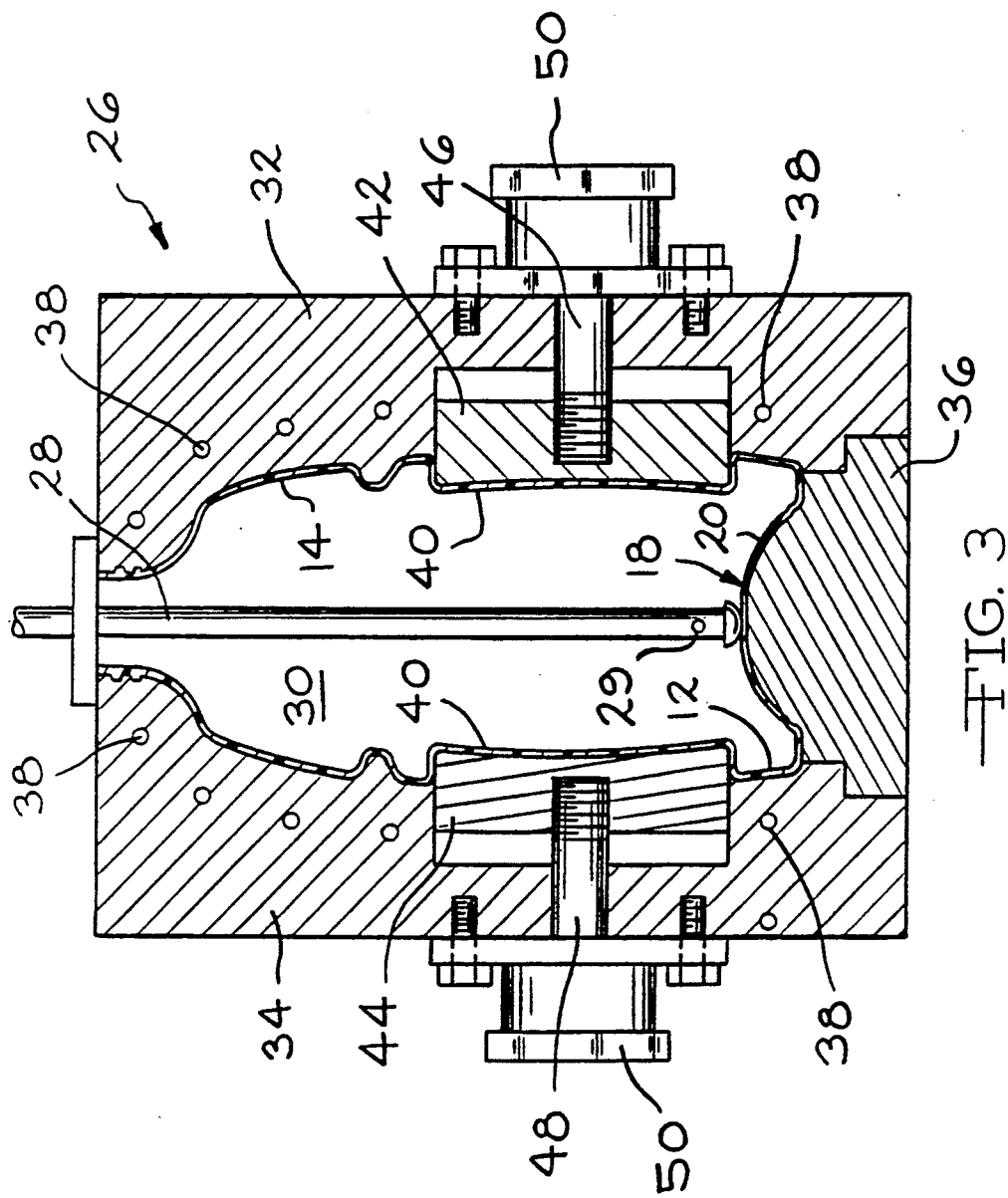
FIG. 3 is a sectional view substantially similar to FIG. 2 showing a blow molded container with portions being mechanically deformed.

In the molding sequence generally illustrated in FIGS. 2 and 3, the preform 24 is axially extended by a stretch rod 28. Air, supplied through a port 29 in the stretch rod 28, blows the preform 24 into conformity with a cavity 30 defined by the interior surfaces of a right mold half 32, a left mold half 34, and a base mold 36.

The container 10 is heat treated to introduce some thermal stability into the PET material. In so doing, heating elements 38 located within the mold halves 32 and 34 are heated to increase the temperature of the mold halves 32 and 34 and to likewise increase the temperature of the PET material in contact therewith. While the PET material is heat treated, it is not heated to those high temperatures required to substantially abate hot fill shrinkage of the PET material. Again, these high temperatures typically range from 220° to 260° F. As will be seen below, the temperature, and the time, utilized in heat treating the present invention only heat sets the PET material to a limited extent.

Since the heating elements 38 increase the temperature of the PET material to a heat treating temperature below that previously used, portions of the present container 10 experience volumetric shrinkage beyond the 1% previously thought to be desirable. This shrinkage is significant enough to cause the fill level of liquid in the container 10 to rise and overflow the container 10.

To prevent liquid overflow in response to the increased thermal shrinkage, the present invention is provided with portions which are specifically manipulated to expand outwardly during hot fill. This is achieved by deforming a portion of the container inward prior to filling and during molding. The deformation is directed inward relative to the cavity 30 and produces a second container configuration having a decreased volumetric size. In FIG. 3, side panels 40 of the container 10 are deformed inward of the cavity 30 by corresponding movable portions 42 and 44 of the right and left mold halves 32 and 34. In the illustrated embodiment, the movable portions 42 and 44 are mounted on post members 46 and 48 and are extended by actuators 50 to deform the side panels 40. As can be readily seen, various actuator mechanisms 50 can be used.

Alternatively, the side walls 12 can be deformed inward during the exhaust cycle of the molding process. If air is evacuated from the blown configuration at a high rate, a negative pressure will result therein. This in turn will cause the side walls 12 of the container 10 to deform inwardly.

When deformed inward, a portion of the PET material forming the side panels 40 becomes reversely oriented introducing memory into the PET of the container 10. This new memory is that of the first molded configuration of the blown container 10 (i.e. a second preform configuration). The container 10 is then cured, cooled and/or cooled in this second configuration and removed from the blow molding machine 26.

As a result of the PET's reverse orientation and its "memory", during hot fill, the container 10 will react to the elevated temperature of the hot fill liquid and the side panels 40 will expand outwardly, generally back to the first configuration. The side panels 40 thus partially increase the volumetric size of the container 10 during hot fill. Since the remainder of the container 10 is experiencing a degree of thermal shrinkage, the net effect is an offset of the shrinkage. By manipulating the heat set temperature, the length of time for which this heat is applied, and the amount of inward deformation performed on the side panels 40, a container 10 can be constructed having a volume which will remain substantially constant or experience an increase in volume in response to hot filling.

Figure 4:
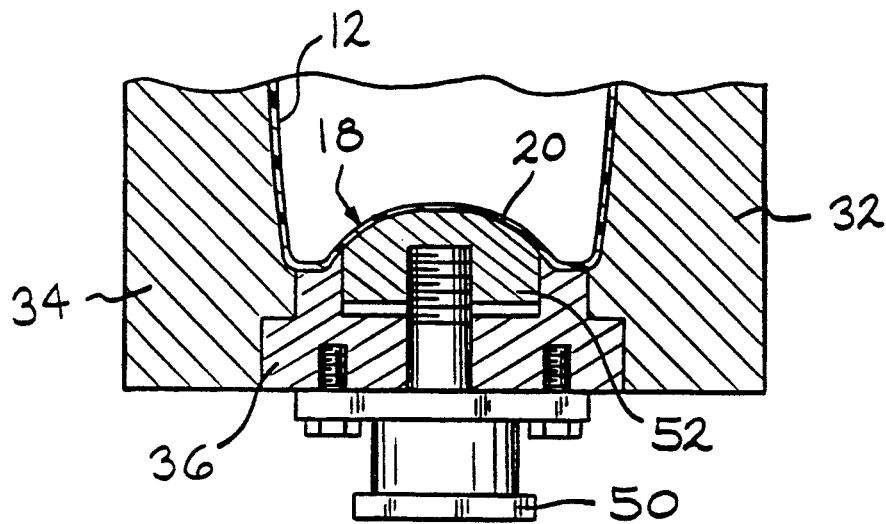
FIG. 4 is a sectional view of a portion of a container embodying the principles of the present invention being molded in a blow molding machine.
Figure 5:
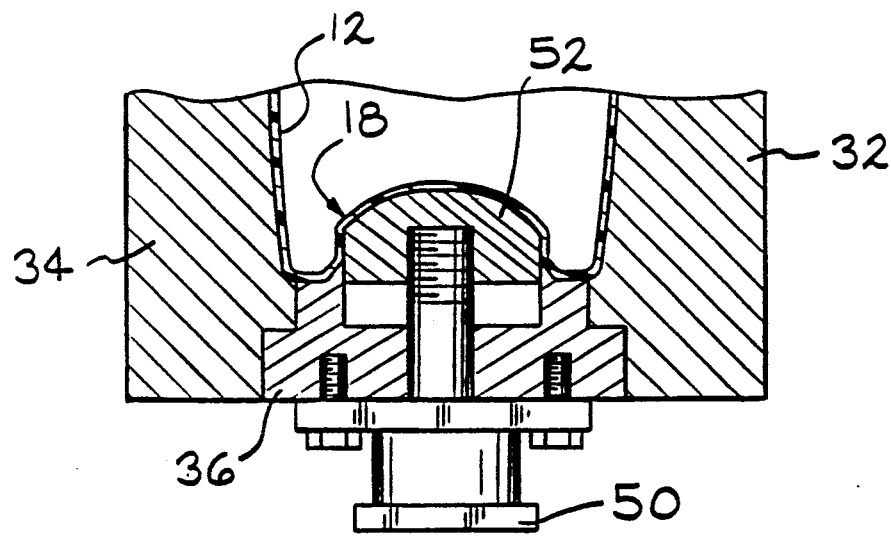
FIG. 5 is a sectional view substantially similar to that of FIG. 4 illustrating a portion of a blow molded container being mechanically deformed to introduce reverse orientation into the PET material.

In FIGS. 4 and 5, as an alternative to the deformation of the side panels 40, the base 18 of the container 10 is shown as having its dome 20 mechanically deformed by a movable portion 52 of the base mold 36. Thus, in response to hot filling, the base 18 would likewise deform outward in a manner similar to the side panels 40 discussed above.

As seen from the above discussion, the present invention has numerous advantages and advancements. One advantage is that the cycle time for producing a hot fill container is reduced. This reduction occurs because of the decreased heat treating temperature. No longer is an extended amount of time required to heat the PET material to significantly high temperatures, nor is an extended amount of time required to cool the container from these high temperatures. The reduction in heat treating temperature also allows for a reduction in energy consumption as a result of the lower energy demand. Additionally, the outwardly deformable portions provide for greater design freedom in the final container 10 shape. The invention is applicable to both injection molded PET preforms and to extruded PET parisons.

While the above description constitutes the preferred embodiments of the present invention, it will be appreciated that the invention is susceptible to modification, variation and change without departing from the proper scope and fair meaning of the accompanying claims.

We claim:

1. A method of blow molding a hot fill polyester container, said method comprising the steps of:
    providing a preform of polyester material;
    forming said preform into a first configuration of said container by blow molding said preform outward into conformity with interior surfaces defining a mold cavity within a blow molding machine;
    treating said first configuration of said container with heat by heating said first configuration to a temperature sufficient to induce a predetermined amount of thermal stability into said container;
    reshaping a portion of said first configuration inwardly of said cavity to form a second configuration of said container, said reshaped portion developing a region of molecularly oriented polyester;
    cooling said polyester while maintaining said second configuration; and
    removing said container from said mold cavity thereby providing a container having a reshaped portion, said reshaped portion being outwardly thermoelastically deformable into a predetermined shape in response to being hot filled and as a result of said reshaping.

2. A method as set forth in claim 1 wherein said first configuration is heat treated by heating to a temperature sufficient to induce rapid crystallization in said polyester to heat set said first configuration of said container to a limited extent.

3. A method as set forth in claim 1 wherein said portion is reshaped by mechanical movement of a mold part corresponding to said portion.

4. A method as set forth in claim 1 wherein said polyester is polyethylene terephthalate (PET).

5. A method as set forth in claim 4 wherein said preformed article is of extruded PET.

6. A method as set forth in claim 4 wherein said preformed article is of injection molded PET.

* * * * *